Patented Jan. 5, 1932

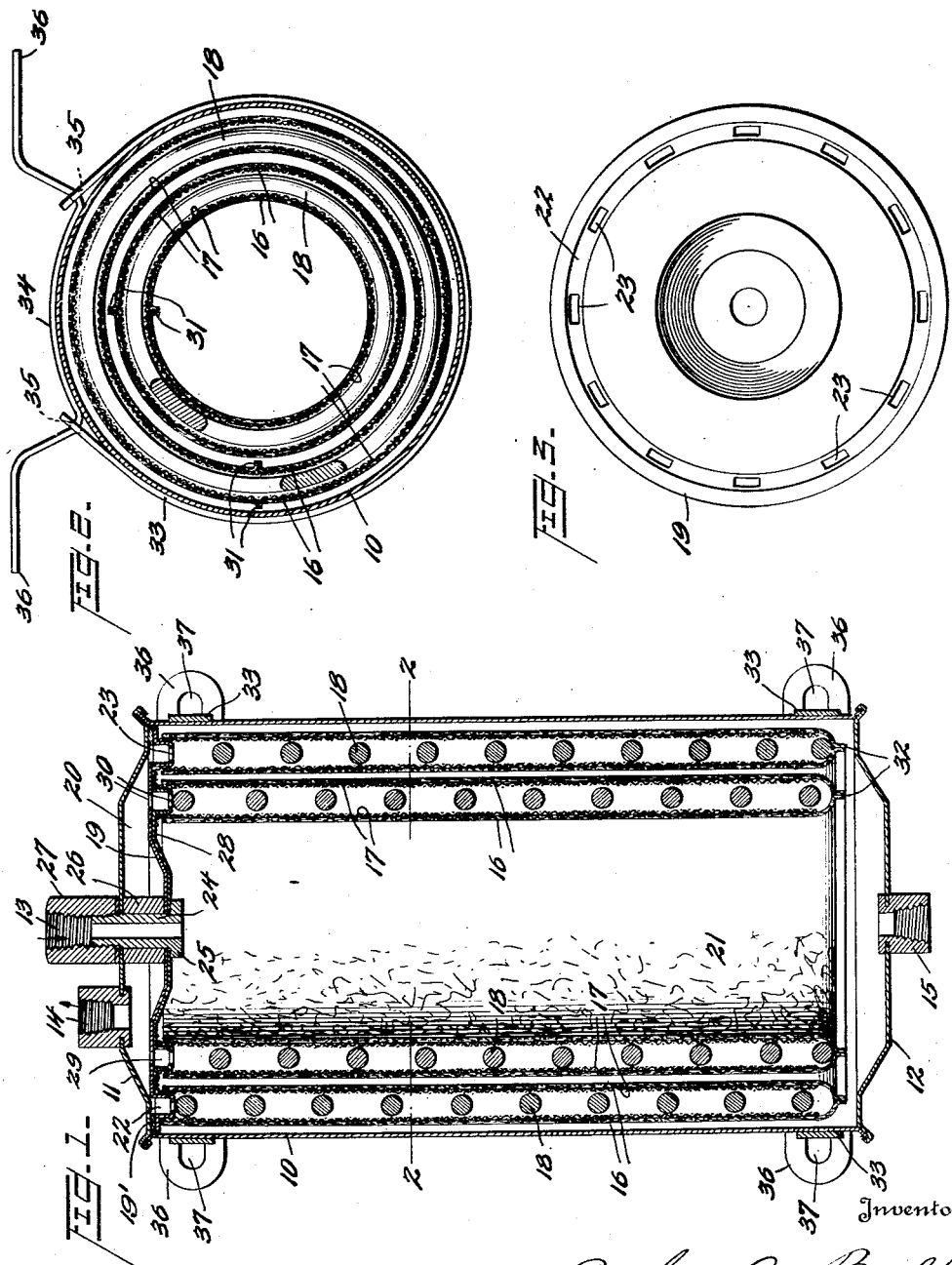

1,840,153

UNITED STATES PATENT OFFICE

ARTHUR A. BULL, OF DETROIT, MICHIGAN, ASSIGNOR TO HANDY CLEANER CORPORATION, OF DETROIT, MICHIGAN, A CORPORATION OF MICHIGAN

OIL FILTER

Application filed June 5, 1929. Serial No. 368,563.

This invention relates to oil filters for the lubrication systems of internal combustion engines, or other machinery having continuous oil circulation, and more particularly to the full flow type, in which all of the oil supplied to the engine bearings passes through the filter.

It is one of the principal aims of the invention to provide an improved filter of the full flow type.

It has been found that in order to obtain the requisite degree of filtration and to remove the contamination as fast as it normally accumulates, the rate of flow of oil through the filter must be fairly high. Therefore to preserve the life of the filter over an economic period, the area through which the fluid is filtered must be sufficiently large to insure a satisfactory flow, even after a large amount of contamination or foreign matter is deposited on the filter surfaces. Further, since the pressures at which such lubricating systems are usually operated are likely to be low, often not exceeding five pounds per square inch, the area must be sufficient to introduce a minimum resistance to the flow of oil. In other words, the pressure drop across the filter must be low.

As space is at a premium about machinery of the kind for which this filter is adapted, and particularly around the motors of automotive vehicles, it is of prime importance that the volume of the filter be small. In the present structure a large area of filtering surface is contained in a small space by arranging the filtering material in concentric layers, and to insure effective use of the whole area, means are provided to positively separate adjacent layers.

It is therefore an important object of the invention to provide a filter in which a large area of filtering surface is confined within a small space.

It is highly important that the entire filtering surface be presented to the oil, for otherwise the accumulations or deposits resulting from a localized delivery of the oil to a small section of the filter, would tend to clog it at that particular point, set up increased resistance, and prevent the efficient use of the filter surface.

It is therefore another important object of the invention to cause the oil or fluid to distribute itself over the entire filter surface.

The present invention comprises a filter bag or envelope having spaced walls of filtering material with the oil fed to the exterior of the bag. This results in the bag being subjected to a pressure which tends to collapse it and force the walls of filtering material into contact with one another, preventing the easy exit of the filtered oil. Suitable means are employed to space and reinforce the layers so that they will not contact with each other from the external pressure.

It is therefore another object of the invention to provide a filter bag with means to prevent the same from yielding or collapsing.

It is an important feature of the invention to provide an oil filter having concentric filtering surfaces therein arranged to cause the oil to flow in opposite directions through alternate filtering surfaces.

A further feature of the invention is the provision of a filter which is simple, efficient, and fool-proof in operation, and of strong, but inexpensive construction.

Other objects and advantages of the invention will be apparent, as the following description proceeds, when taken in connection with the accompanying drawings, in which:

Figure 1 is a longitudinal section of a filter constructed according to the present invention;

Figure 2 is a transverse section taken along the line 2—2 of Figure 1; and

Figure 3 is a detailed plan view of the interior partition for the filter.

Referring more particularly to the drawings, the filter comprises an outer tubular casing 10 having end caps 11 and 12 respectively, secured thereto in any desired oil-tight manner to form a closed chamber. The chamber is provided with an inlet 13 through which oil is introduced into the filter, and an outlet 14 from which the filtered oil is delivered. A drain opening is provided at 15 of the same construction as the inlet 13, so that the inlet may be arranged at this point, instead of at 13, if desired, the unused opening being suitably plugged.

The filtering medium 16 is formed of a screen wire cloth, felt or other suitable fabric. In the form shown the filtering surfaces are cylindrical and strengthened by internal reinforcing screens 17, which are also cylindrical. The filtering surfaces 16 are arranged as pairs of spaced concentric cylinders, and the ends of the inner and outer surfaces are closed to form a tubular envelope comprising a single filtering element.

The casing contains one or more filtering elements, each constituting an envelope, as above described, and where several elements are used they are of different diameters arranged concentrically and in spaced relation. To prevent the filtering media of an envelope from contacting with each other, a helically wound wire 18 is placed inside of each envelope. The turns of the wire 18 serve to keep the reinforcing screens 17 in spaced relation, and thereby separate the filtering surfaces 16. Owing to the helical shape of the wire, the oil has access to the whole area of the filtering surface.

In the form of the invention shown in the drawings, a partition 19 is arranged within the casing 10, dividing the chamber into an inlet compartment 21 and an outlet compartment 20. The details of this partition are shown in Figure 3. A deep annular groove 22 is formed in the partition, and the bottom wall thereof is provided with a series of perforations 23.

The envelope including the filtering surfaces 16 may be constructed from flat sheet material bent in tubular form and having its meeting edges secured together as by stitching such as shown at 31 in Figure 2. The bottom circular edges of two such tubular members when arranged concentrically will then be secured together as shown at 32 in Figure 1, by stitching or any other desired fastening means. The other end of the envelope is closed by securing the upper edges of the two cylinders to the side walls of the channel 22 which serves as a spacer for the upper parts of the reinforcing screens 17.

The elements heretofore described may be assembled in a great variety of detail, but one specific embodiment of the invention is shown in the drawings for the purposes of illustration. In this form the casing 10 is cylindrical, and the end caps 11 and 12 are formed of sheet material crimped onto the ends of the casing 10. The caps are slightly dished outwardly for greater rigidity. A tubular member 24 is fitted through the inlet aperture in the cover 11 and through the central aperture in the partition 19 which is dished oppositely to the cap 11 to form the compartment 20. This member 24 is provided with an enlarged head 25 which seats on the under surface of the partition 19. A collar 26 serves as a spacing means between the cap 11 and the partition 19 to prevent deforming the parts 11 and 19 when the inlet coupling 27 is tightened on the sleeve 24. However, the partition 19 is sufficiently flexed to cause its periphery to bear tightly on the gasket 19' to form an oiltight fit between the parts 11 and 19.

The partition 19 shown in Figure 3, is arranged for a filter having but one filtering element. However, a plurality of concentric filtering elements may be provided as shown in Figure 1. For each additional element is provided a plate 28, similar to the partition 19, and having a groove 29 but of smaller diameter than the groove 22. This plate 28 engages the underside of the partition 19 inside of the groove 22. The inner portion of the plate 28 is clamped, along with the partition 19, between the collar 26 and the head 25. The outer margin of the plate 28 has oiltight engagement with the partition 19. The helical wire spacer 18 and the reinforcing screens 17 will be applied in the manner as hereinbefore described to the additional filtering elements. Apertures 30 are provided in the partition 19 to coincide with the groove 22 for communication between the interior of the inner element and the outlet compartment 20.

To support the filter as a whole, straps 33 are passed around the upper and lower ends of the casing 10, and other straps 34 are passed through slots 35 in the ends of the straps 33. The straps 34 are then bent outwardly at the slots 35, gripping the casing between the two straps. The ends of the straps 34 are shaped to form ears 36 having holes 37 therein to receive bolts or other fastening means by which the container may be supported upon the engine casing, the dash, or any convenient portion of the motor vehicle.

The operation of the filter is as follows: The contaminated oil from the crank case is forced into the inlet 13 under the pressure of the engine oil pump, and completely fills the chamber 21. The pressure forces the oil through the filtering surfaces 16 to the interior of the respective filtering elements. It should be noted that with respect to each element the flow is from the outside toward the interior. Thus the flow through each filtering surface is in a direction opposite to the flow through the next adjacent filtering surface. In this manner a very large area of filtering surface is in operation at the same time. The reinforcing screens 17 and the wire spacers 18 enable the elements to resist high pressures so that the oil may be forced through the filter very rapidly. The purified oil inside of each element passes through the apertures 23 and 30 into the chamber 20 which receives the purified oil so that the entire casing is normally full of oil. The pressure from the oil pump finally forces the purified oil through the outlet 14 to the engine bearings or other parts to be lubricated according to the installation.

In the form shown in the drawings, the end caps are crimped to the casing. This results in a permanent installation constructed for heavy duty without any attention, so that when the filter becomes clogged or for any reason fails to function properly, it cannot be overhauled except by destroying the casing. However, it is within the purview of my invention to provide detachable securing means for the interior elements as well as the end caps, so that the filter may be overhauled and reassembled.

While the invention has been shown and described in comparative detail for one embodiment thereof, it is not intended to be limited to the detail forms shown, but includes such modifications and rearrangements as come within the scope of the appended claim.

Having thus described the invention, what is claimed as new and desired to be secured by Letters Patent is:

A filter of the class described, comprising in combination a casing having an inlet and an outlet, a partition dividing the casing into two compartments, one in communication with the inlet and the other in communication with the outlet, a circular ridge in said partition, cylindrical screens secured to the edges of said ridge, an envelope of filtering material secured over both screens and apertures in a wall of said ridge affording communication with the interior of its envelope, a plate engaging said partition within the area defined by the ridge and itself having a ridge and filtering envelope, and openings in said partition communicating with said second envelope.

In testimony whereof I hereunto affix my signature.

ARTHUR A. BULL.